R. M. BICKLEY AND E. J. MASON.
FEEDING APPARATUS FOR COKE WHARVES.
APPLICATION FILED NOV. 2, 1918.
1,333,378.
Patented Mar. 9, 1920.
5 SHEETS—SHEET 5.
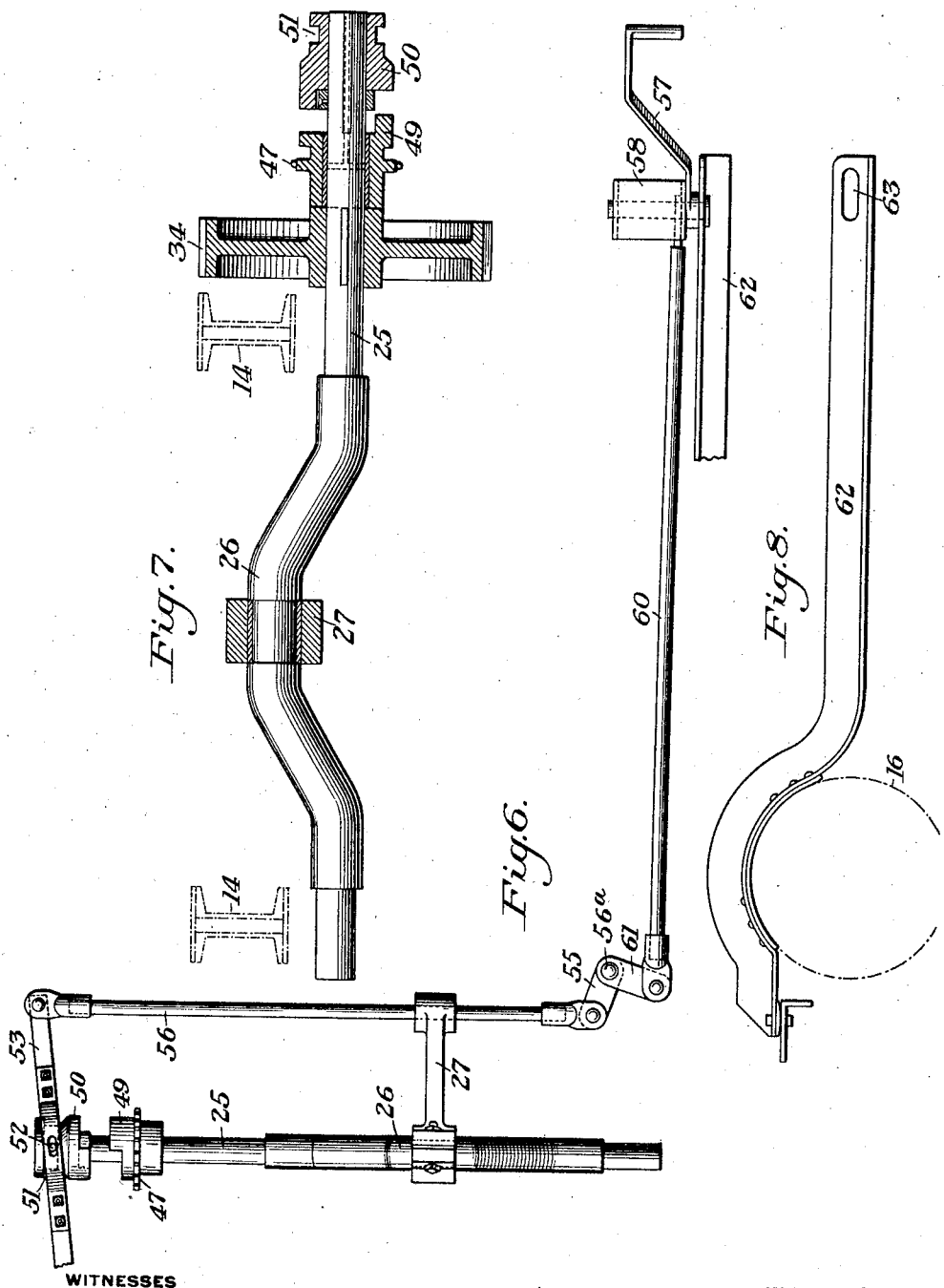

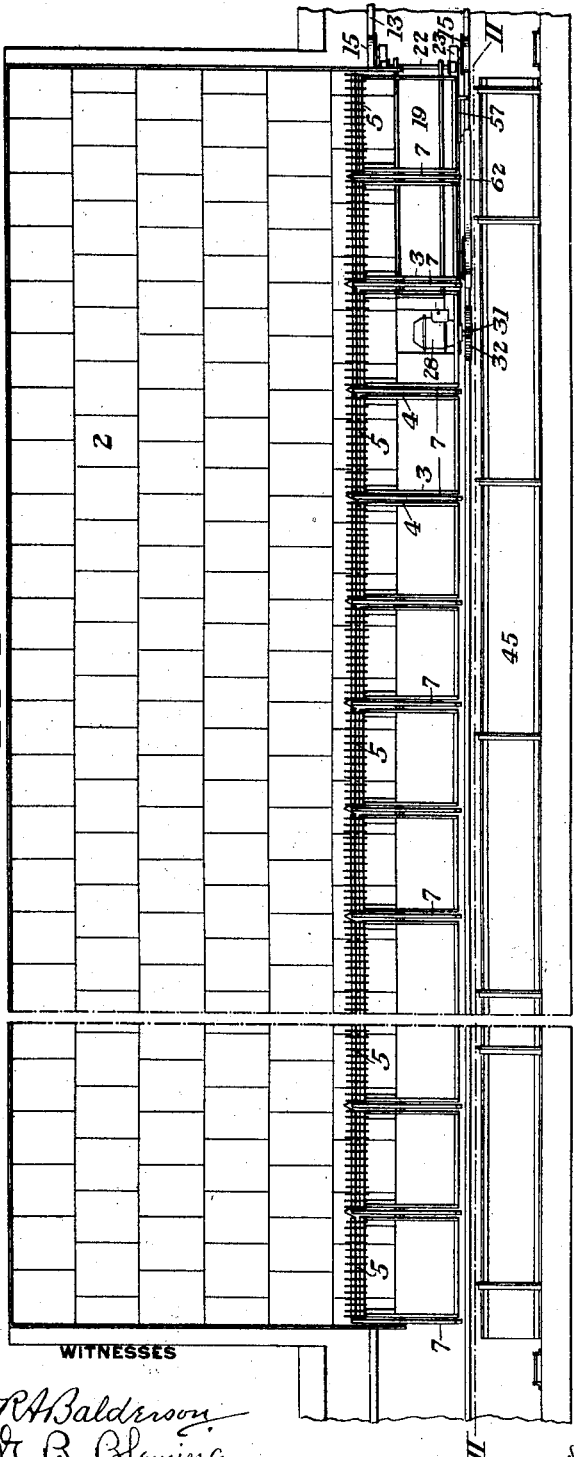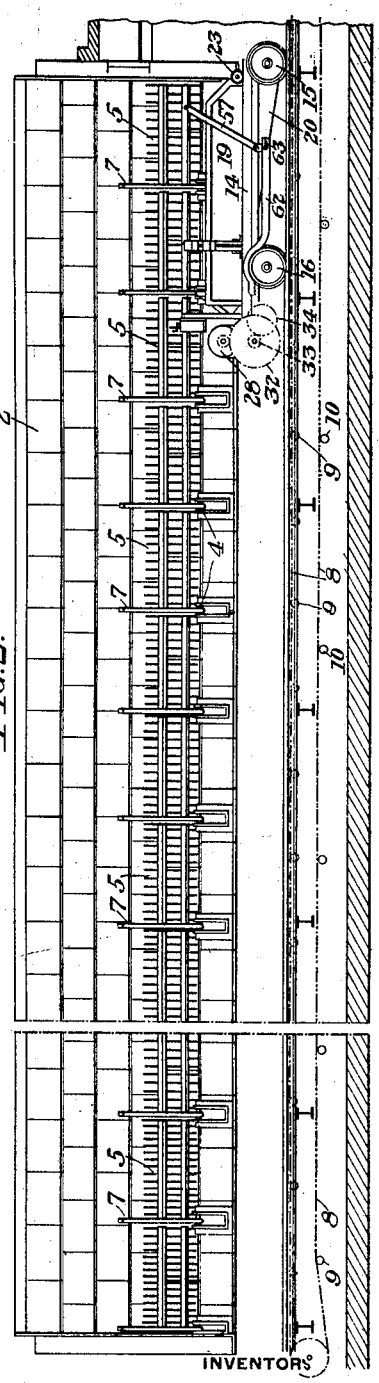

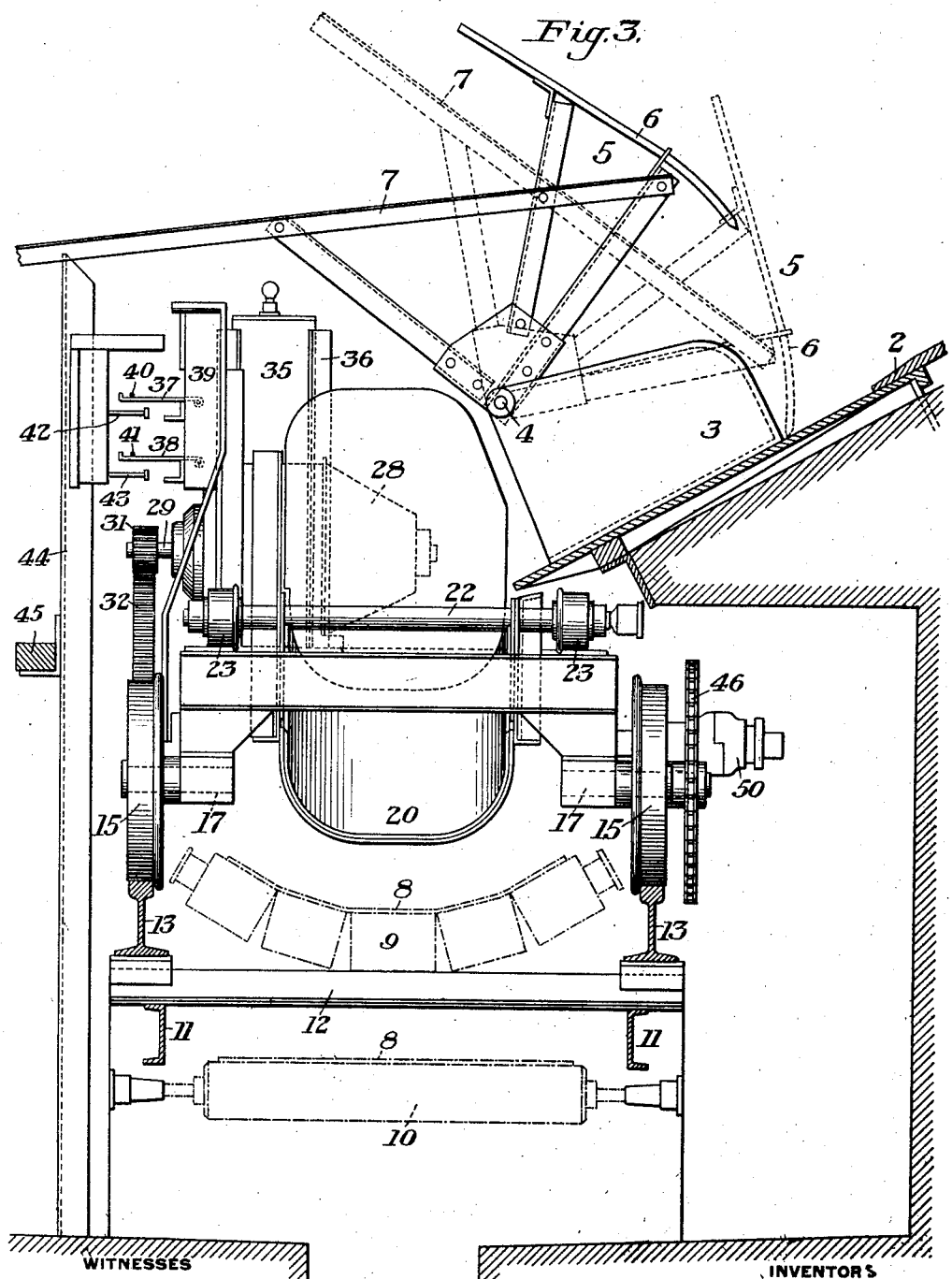

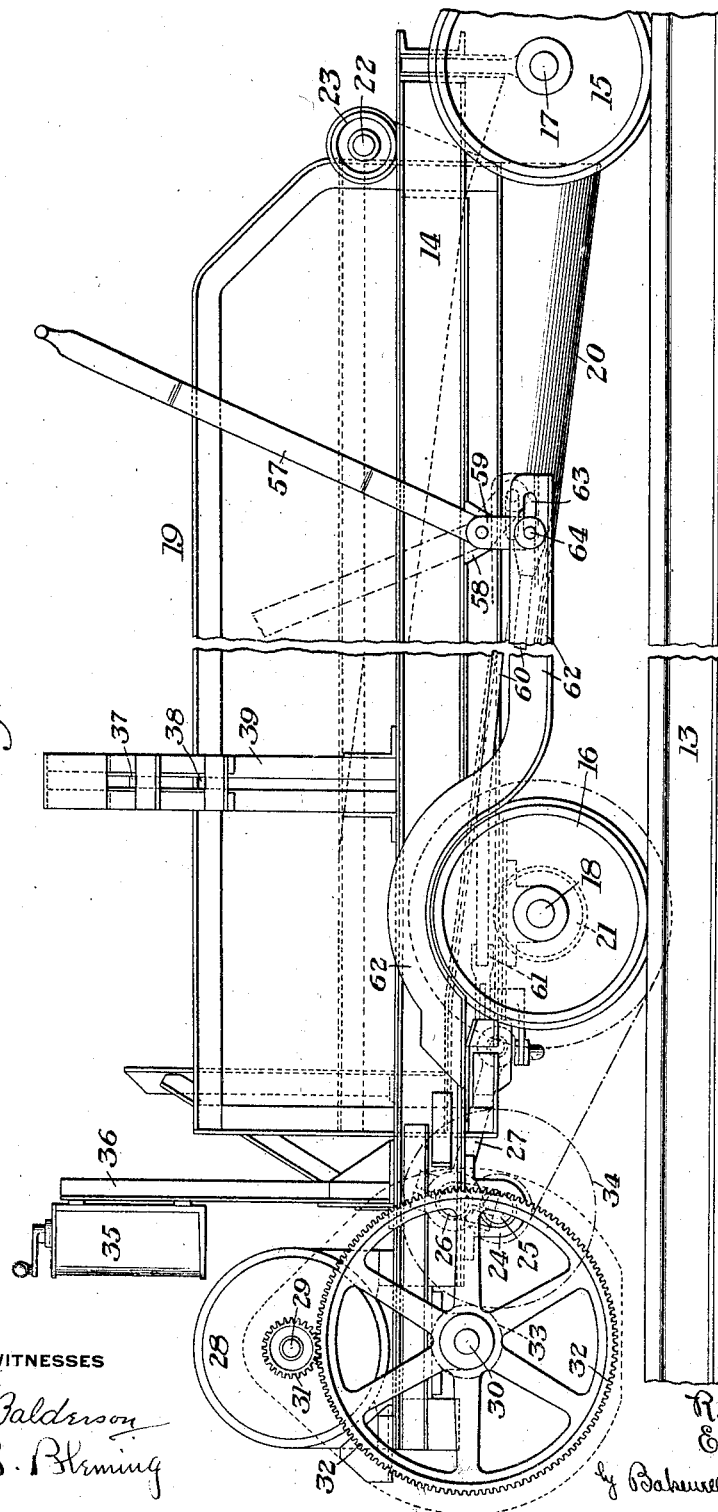

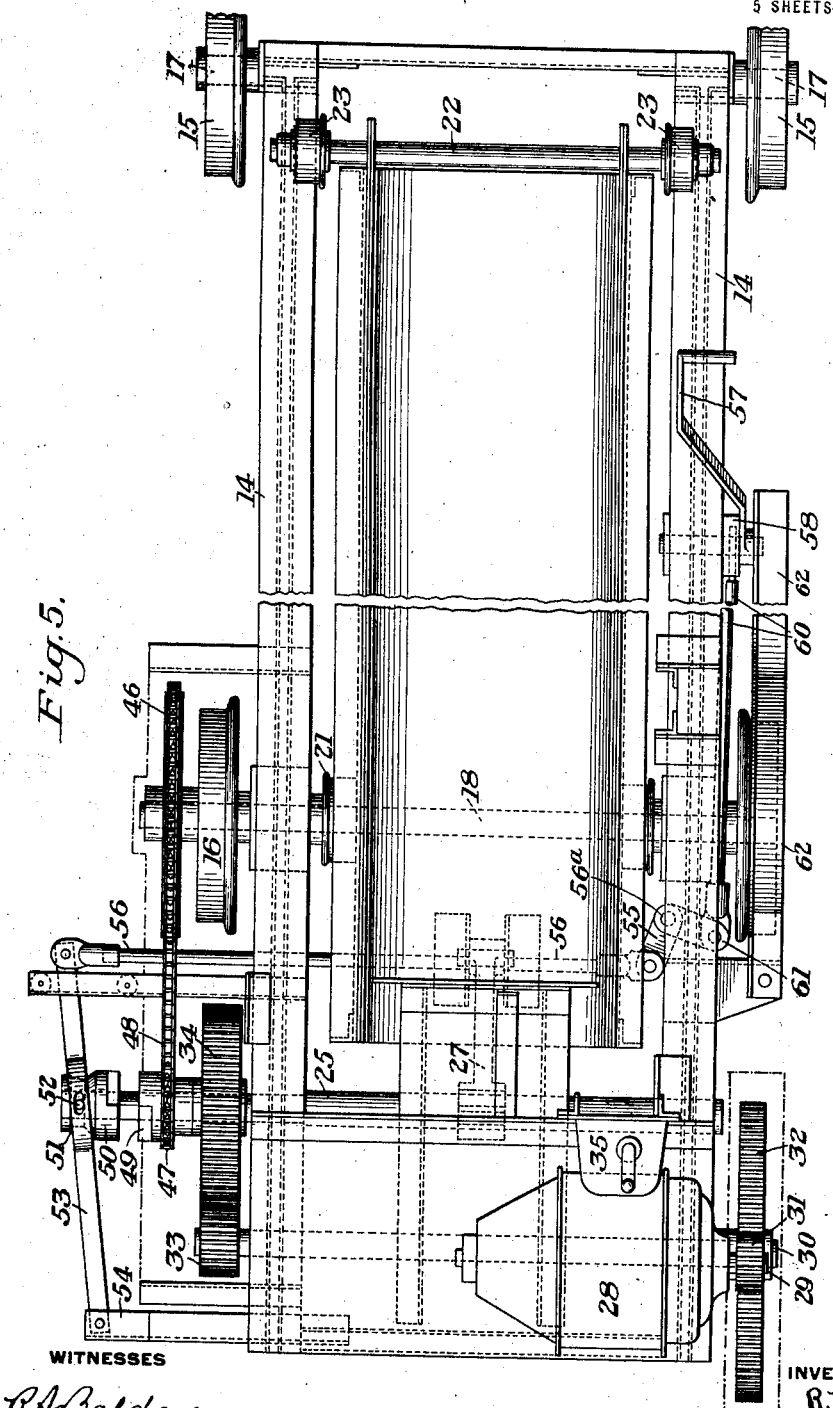

UNITED STATES PATENT OFFICE.

ROSS M. BICKLEY AND ELLIOTT J. MASON, OF PITTSBURGH, PENNSYLVANIA, ASSIGNORS TO HEYL & PATTERSON, INCORPORATED, OF PITTSBURGH, PENNSYLVANIA, A CORPORATION OF PENNSYLVANIA.

FEEDING APPARATUS FOR COKE-WHARVES.

1,333,378. Specification of Letters Patent. Patented Mar. 9, 1920.

Application filed November 2, 1918. Serial No. 260,829.

*To all whom it may concern:*

Be it known that we, Ross M. BICKLEY and ELLIOTT J. MASON, both citizens of the United States, both residing in Pittsburgh, Allegheny county, Pennsylvania, have invented a new and useful Improvement in Feeding Apparatus for Coke-Wharves, of which the following is a full, clear, and exact description, reference being had to the accompanying drawings, forming part of this specification, in which—

Figure 1 is a plan view of a coke wharf, showing one form of our improved feeder in connection therewith.

Fig. 2 is a side view of the same.

Fig. 3 is a detail transverse sectional view of a portion of the wharf shown in Fig. 1, on a larger scale, and in which we have shown a feeder.

Fig. 4 is a side elevation of the feeder shown in Fig. 3.

Fig. 5 is a plan view thereof.

Fig. 6 is a detail plan view of the clutch mechanism.

Fig. 7 is a detail sectional view on a line with the driving shaft for the reciprocating feeder, showing the clutch mechanism, and Fig. 8 is a detail side elevation of the brake device.

This invention has relation to feeding apparatus for coke wharves; and is designed to provide apparatus of this character by means of which coke may be fed from an inclined coke wharf to a traveling conveyer in a uniform manner, without danger of clogging, with a minimum of wear upon the conveyer and breakage of the coke being fed, the coke having a minimum drop or fall in passing from the wharf to the conveyer.

The device comprises a reciprocating feeder mounted on a car, which feeder is arranged to be moved along a track in front of the coke wharf and above the conveyer. The lower side of the wharf is provided with a plurality of gates which are arranged to be opened to permit the coke to pass from the wharf to the feeder, and which is arranged to feed the coke in a uniform stream to the continuously moving conveyer.

The car is also equipped with a motor for actuating the feeder and for moving the car along the wharf above the conveyer.

The precise nature of our invention will be best understood by reference to the accompanying drawings, which will now be described, it being premised, however, that various changes may be made in the details of construction and general arrangement of the parts, without departing from the spirit and scope of our invention, as defined in the appended claims.

In the accompanying drawings, the reference character 2 designates a coke wharf which is inclined, and onto which the coke is dumped from the usual and well known side dump quenching cars, which receive the coke from the ovens. The coke is dumped at various places along the wharf in the usual manner.

The lower side of the wharf is provided with a plurality of guide members 3 which form chutes for guiding the coke from the wharf to the feeder, as hereinafter described. Pivotally connected at 4 to the various chute members 3 are gates 5, there being one gate between adjacent guide members, the arrangement being such that when one or two of the gates are opened, the coke on the wharf above the guides controlled by the gates will pass to the feeder. Each of these gates comprises a framework and a plurality of fingers or rods 6 connected to the end of the framework, and 7 are operating handles connected to the framework of the gates.

8 is a belt conveyer movably mounted on suitable rollers 9 and 10 at the one side of the wharf, but in a lower plane, and to which the coke is fed from the wharf to be conveyed to any desired point.

Mounted on suitable framework 11 extending parallel to the belt conveyer 8 are cross-ties 12, on which are supported rails 13. Movably mounted on these rails 13 is a car having a frame 14, and supporting wheels 15 and 16. The supporting wheels 15 are mounted on stub axles 17, while the wheels 16 are secured to an axle 18. 19 is a reciprocating coke feeding device which is arranged to be reciprocated on the frame 14 of the car, and which feeding device is provided with a downwardly and forwardly sloping bottom 20. The rear end of this feeding device is supported on flanged wheels 21 rotatably mounted on the axle 18, while the front end of the feeder is supported on an axle 22 having flanged wheels 23 which are mounted to roll on the top of the frame 14.

Journaled in bearings 24 connected to the rear end of the frame of the car is a crank shaft 25 having a crank 26, which is connected to the reciprocating feeder 19 by means of a pitman 27.

Supported on the rear end of the frame 14 of the car is a motor 28 having a shaft 29 which is geared to a rotatable shaft 30 by means of gears 31 and 32. This shaft is journaled in suitable bearings connected to the rear end of the frame 14 of the car. Connected to this shaft 30 is a gear wheel 33 which is in mesh with a gear wheel 34 connected to the shaft 25, so that the shaft 25 will be continuously rotated, which will in turn reciprocate the feeder 19.

35 is an electric controller mounted on a standard 36 connected to the frame 14 of the car, and which controller is in electrical connection with fingers or trolley members 37 and 38 mounted on a support 39 on the car frame. These trolley members are arranged to contact with the trolley wires 40 and 41 during the passage of the car along the tracks, in order to complete the circuit from a suitable source of energy through the controller and motor. These trolley wires 40 and 41 are arranged to be supported by pins 42 and 43 connected to stationary framework 44, which framework extends along the front of the wharf.

45 is a longitudinal platform supported on the framework 44, and which platform extends parallel with the wharf and rails 13.

Connected to the axle 18 is a sprocket wheel 46 which is connected to a sprocket wheel 47 by means of a sprocket chain 48. The sprocket wheel 47 is rotatably mounted on the shaft 25, and is provided with a clutch member 49 arranged to be engaged by a clutch member 50 slidably mounted on the shaft 25, but which is arranged to be rotated thereby. The clutch member 50 is provided with an annular groove 51 for the reception of a suitable collar having pins 52 which are engaged by a clutch actuating lever 53. This clutch actuating lever 53 is pivoted to an arm 54 on the car frame, the other end thereof being connected to one arm of a bell crank lever 55 by means of a link 56. This bell crank lever is pivotally connected to the truck frame at 56ᵃ. 57 is a clutch operating lever pivoted to a bracket 58 on the car frame 14, and which clutch lever is provided with a downwardly extending arm 59. 60 is a link connected to the extension 59 and the other arm 61 of the bell crank lever. 62 is a brake lever pivoted at one end to the frame of the car, and which is arranged to engage one of the wheels 16 for supporting the car. The other end of this brake lever 62 is provided with a slot 63 which is engaged by a pin 64 which extends outwardly from the extension 59 of the clutch operating lever 57.

The connections between the clutch operating lever 57, and the clutch and brake lever are such that the brake will be applied when the clutch members are disengaged, and will be removed when the clutch members are in engagement with each other, so that the car will be moved either forward or backward by the motor 28.

The coke as it is brought from the ovens by the dump car after it is quenched, is usually dumped in a continuous manner along the wharf from one end to the other, so as to distribute it in a fairly even stream all over the wharf. At the beginning of the operation the feeder car is moved to the end of the wharf which received the first charge of coke, and the first two gates 5 are opened to permit the coke to pass from the wharf through the first two guide chutes formed by the members 3. The coke is fed to the vibrating feeder 19, which in turn feeds the coke in an even stream to the belt conveyer 8, which in turn conveys it to the desired point. After all of the coke which will pass from the wharf through the first two gates has passed to the feeder, the first gate is closed and the feeder moved the distance of one gate and the third gate then opened. The feeding device is thus moved successively from gate to gate to feed the coke to the conveyer as it passes from the wharf to the feeder.

The advantages of our invention result from the provision of a traveling coke feeder which is arranged to be moved in a step by step manner along the edge of a coke wharf to receive the coke discharged therefrom and to feed it in an even stream to a traveling conveyer below the feeding device. Another advantage of our invention results from the provision of a self-contained coke feeding device having a motor thereon for actuating the reciprocating feeder, and for moving the feeder in a step by step manner, together with means for simultaneously releasing the brake for the feeder truck wheels and connecting the step by step driving mechanism with the feeder actuating mechanism, or for applying the brake when the clutch is released.

It will also be noted that with the apparatus described, the coke is received from the wharf onto the feeder over one edge of the feeder so that it is distributed throughout the length of the feeder instead of being deposited in a heap at one end portion thereof. Futhermore, by reason of the inclination of the feeder, it will be apparent that it can be brought closely up to the discharging end of the wharf, and that its discharge end may be brought down close to the conveyer. In this manner, the fall or drop of the coke is minimized, this not only reducing the breakage of the coke, but also greatly reducing abrasive action and wear on the conveyer.

Another advantage of our invention results from the fact that it is not necessary to closely regulate the discharge from the wharf onto the feeder by means of the gates. The coke on the wharf can be discharged onto the feeder as rapidly as may be, and the discharge from the feeder to the belt may be controlled by the reciprocations of the feeder over the conveyer.

We claim:

1. The combination of a coke wharf and a conveyer in front of said wharf, of a traveling coke feeder arranged to be moved along the wharf in a direction parallel to the length of the conveyer for feeding the coke to the conveyer, and a plurality of gates for controlling the passage of coke to said feeder over one side thereof; substantially as described.

2. The combination with a coke wharf and a conveyer in front of said wharf, of a coke feeding car traveling in front of said wharf in a direction parallel to the length of the conveyer, a reciprocating feeder on said car for receiving the coke from the wharf and feeding it to the conveyer, means on said car for actuating the feeder, and a plurality of gates on the wharf for controlling the passage of coke to said feeder; substantially as described.

3. A movable coke feeding device, comprising a movable car arranged to be moved over a conveyer and along the coke wharf, a reciprocating coke feeder mounted on said car, a motor on the car, and actuating connections between said motor and the coke feeder; substantially as described.

4. A movable coke feeder, comprising a car having supporting wheels, a reciprocating coke feeder mounted on said car, a motor mounted on said car, actuating connections between the motor and the feeder for continuously reciprocating the same, actuating connections between the car wheels and said motor, and means for engaging and disengaging said connections; substantially as described.

5. A movable coke feeder, comprising a car having supporting wheels, a reciprocating coke feeder mounted on said car, a motor mounted on said car, actuating connections between the motor and the feeder for continuously reciprocating the same, car driving connections, said connections including a clutch, and means for actuating said clutch to connect and disconnect the car driving connections; substantially as described.

6. A movable coke feeder, comprising a car having supporting wheels, a reciprocating coke feeder mounted on said car, a motor mounted on said car, actuating connections between the motor and the feeder for continuously reciprocating the same, car wheel driving connections, said connections including a clutch for connecting and disconnecting said connections with the motor, a brake device, and an actuating lever for simultaneously moving the brake and the clutch whereby the brake device is applied when the clutch is released and is released when the clutch is applied; substantially as described.

7. The combination with an inclined coke wharf upon which the coke is spread of a conveyer in front of said wharf, and means traveling along said wharf for receiving coke therefrom and feeding the same to said conveyer; substantially as described.

8. The combination with a coke wharf of a conveyer in front of said wharf, and means traveling along said wharf for receiving the coke directly therefrom over one side throughout the major portion of its length, and feeding the same to said conveyer, substantially as described.

9. The combination with a coke wharf upon which the coke is spread for discharge from one edge, of a conveyer in front of said wharf, and means traveling along said wharf for receiving coke directly therefrom and feeding the same to said conveyer, said means regulating the feed to said conveyer, substantially as described.

10. The combination with a coke wharf upon which the coke is spread for discharge from one edge, of a conveyer in front of said wharf, and means having a step-by-step movement along said wharf for receiving coke directly therefrom and feeding the same to said conveyer, substantially as described.

11. The combination with a coke wharf upon which the coke is spread for discharge from one edge, of a conveyer in front of said wharf, and means having a step-by-step movement along said wharf for receiving coke directly therefrom and feeding the same to said conveyer, said means regulating the feed to the conveyer, substantially as described.

12. The combination with a coke wharf and a conveyer adjacent to and below the discharge edge of said wharf, of a feeding device for transferring the coke from the wharf to said conveyer, said feeding device being elongated in the direction of the length of the conveyer and arranged to receive the coke over one of its side edges throughout the major portion of its length and to discharge the same at one end portion thereof, substantially as described.

13. The combination with a coke wharf and a conveyer adjacent to and below the discharge edge of said wharf, of a feeding device for transferring the coke from the wharf to said conveyer, said feeding device being elongated in the direction of the length of the conveyer and arranged to receive the coke over one of its side edges and to discharge the same at one end portion thereof, said device being inclined downwardly toward its discharging end, substantially as described.

14. The combination with a coke wharf and a conveyer adjacent to and below the discharge edge of said wharf, of a feeding device for transferring the coke from the wharf to said conveyer, said feeding device being elongated in the direction of the length of the conveyer and arranged to receive the coke over one of its side edges and to discharge the same at one end portion thereof, together with a support on which said feeding device is movable longitudinally of the conveyer, substantially as described.

15. The combination with a coke wharf and a conveyer adjacent to and below the discharge edge of said wharf, of a feeding device for transferring the coke from the wharf to said conveyer, said feeding device being elongated in the direction of the length of the conveyer and arranged to receive the coke over one of its side edges and to discharge the same at one end portion thereof, and a support on which said feeding device is movable longitudinally of the conveyer, together with means for reciprocating the feeding device on its support, substantially as described.

16. The combination with a coke wharf upon which the coke is spread for discharge from one edge and a conveyer adjacent to and in front of the discharge edge of said wharf, of a feeding device for transferring the coke from the wharf to the conveyer, said feeding device being movable along the wharf over the conveyer to the desired positions, and means for holding said device in said positions, substantially as described.

17. The combination with a coke wharf upon which the coke is spread for discharge from one edge of a traveling conveyer in front of said wharf, and means traveling along said wharf for receiving coke therefrom and feeding the same to said conveyer in the direction of travel thereof, substantially as described.

In testimony whereof we have hereunto set our hands.

ROSS M. BICKLEY,
ELLIOTT J. MASON.